July 30, 1974  W. R. JEWETT  3,826,740
METHOD AND APPARATUS FOR TREATING MULTI-PHASE SYSTEMS
Filed April 19, 1973  3 Sheets-Sheet 1
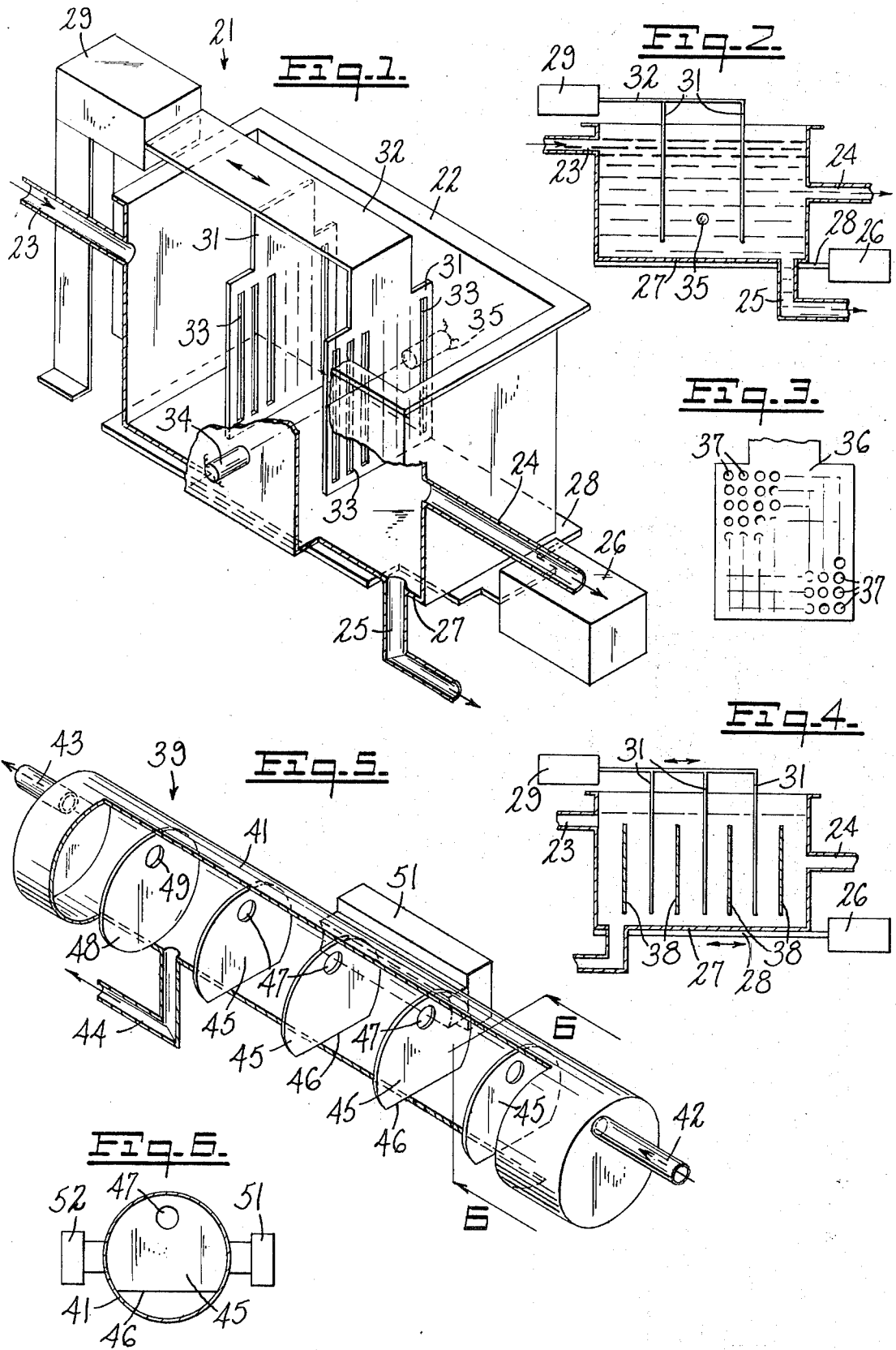

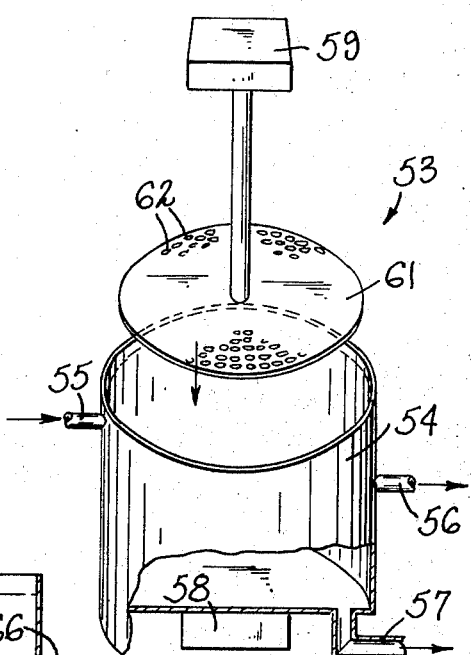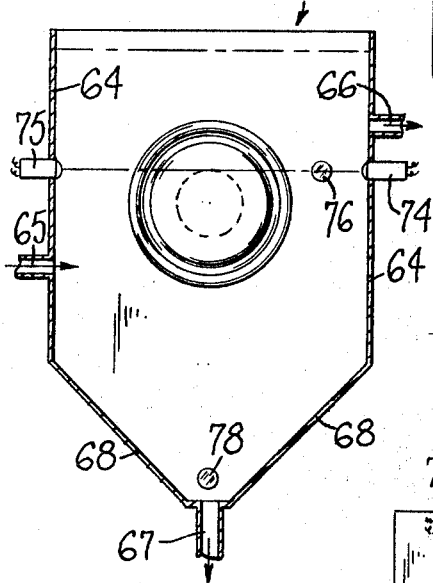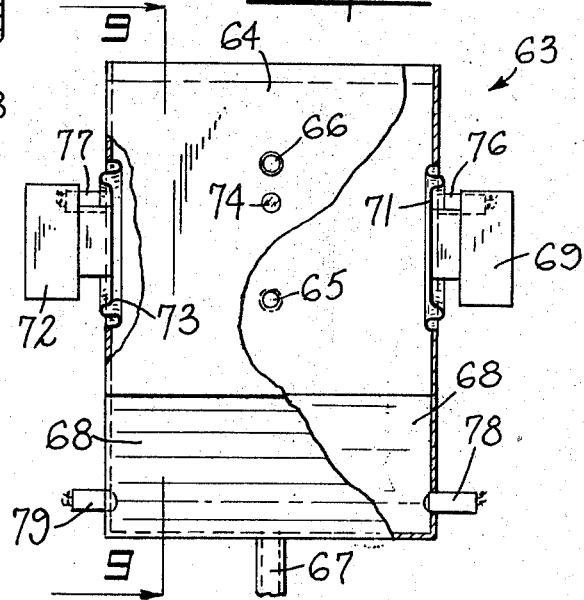

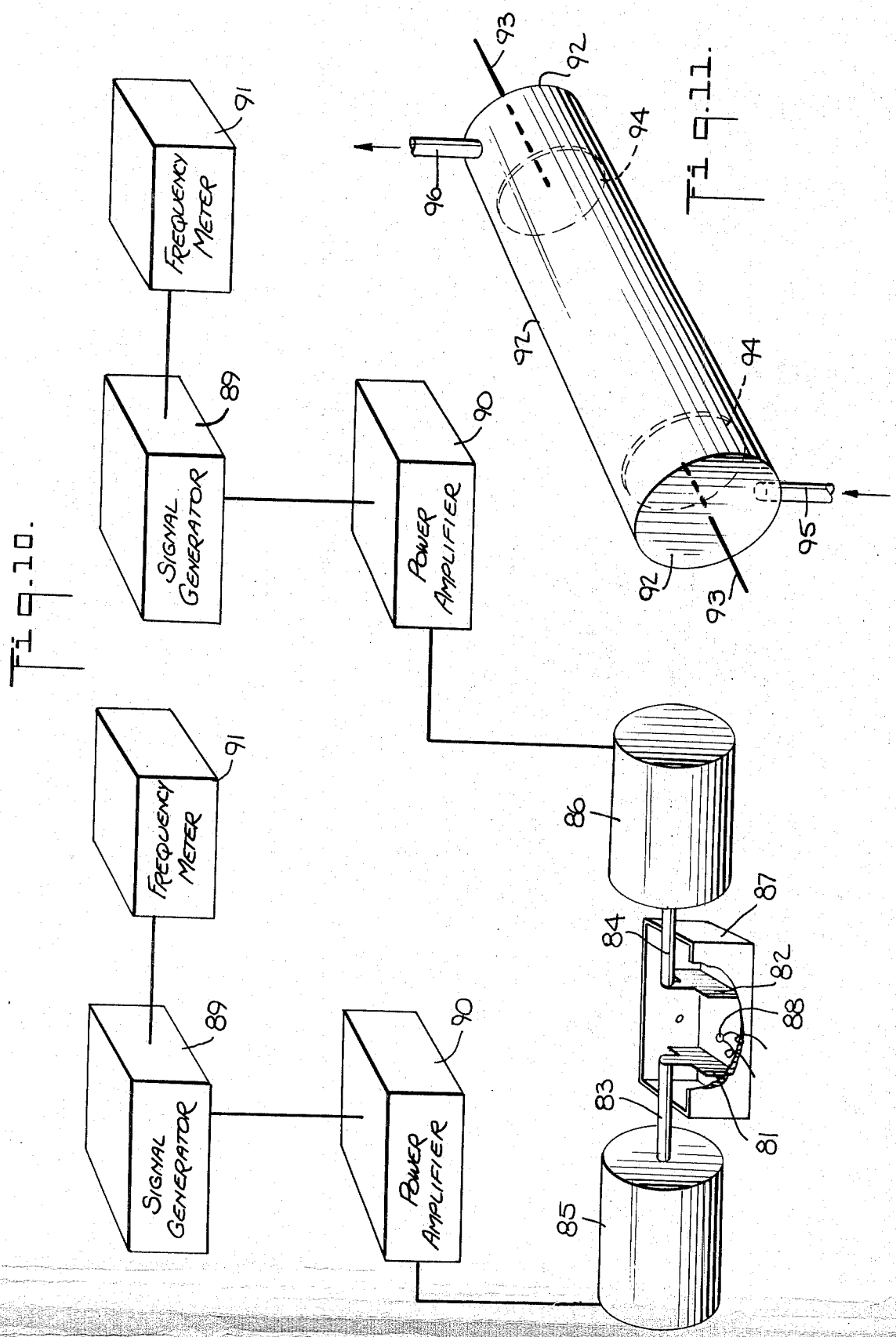

United States Patent Office 3,826,740
Patented July 30, 1974

3,826,740
METHOD AND APPARATUS FOR TREATING MULTI-PHASE SYSTEMS
Warren R. Jewett, 44 Russell Ave., Orange, Conn. 06477
Continuation-in-part of abandoned application Ser. No. 258,014, May 30, 1972. This application Apr. 19, 1973, Ser. No. 352,549
Int. Cl. C02c 1/00
U.S. Cl. 210—19
15 Claims

ABSTRACT OF THE DISCLOSURE

The method of treating a multi-phase system to enhance the separability of at least one discontinuous phase contained therein comprising subjecting the system to at least two disturbances propagated within the system to form at least two wave trains at two different frequencies within the audio frequency range, while avoiding cavitation within the system.

The present invention also discloses an apparatus for treating a multi-phase system having a liquid continuous phase to enhance the separability of a dispersed phase contained within the system, comprising means for confining a volume of the system to be treated, and first and second means for generating vibratory disturbances within the volume to form respective trains of waves therewithin, the first and second generating means being positioned with respect to each other so that the respective wave trains formed within the volume mix.

DESCRIPTION OF THE INVENTION

The present invention relates to a method for enhancing the separability of dispersed systems, and to apparatus therefor. More particularly, the present invention relates to a method for treating a multi-phase system, e.g., a dispersion, suspension or emulsion, to modify a discontinuous phase in a manner which facilitates its separation from the balance of the system by known or accepted separation techniques.

This application is a continuation-in-part application of application Ser. No. 258,014, filed May 30, 1972, now abandoned.

Heretofore, the ease with which a multi-phase system could be separated or fractionated depended in large measure on the nature and state of sub-division of the dispersed or discontinuous phase or phases. Thus, the separation or removal of a finely divided, e.g. colloidal, solid from a continuous liquid medium by known techniques such as filtration, centrifugal separation or gravity settling was extremely difficult and time-consuming, and in some instances not feasible to any useful degree. Likewise, a dispersed phase which is sensitive and subject to denaturing, e.g. certain blood plasma components, cannot be exposed to conventional mechanical aids to separation without undue loss of yield.

It has been discovered that the separability of multi-phase systems is enhanced by subjecting the system to disturbances propagated within the system to form trains of waves. Preferably, the waves are formed at a relatively low frequency within the audio frequency range, but not necessarily at a uniform or non-varying frequency. One convenient mode of performing the present invention comprises maintaining the system to be treated within a confined space, and introducing sonic energy of at least two different audio frequencies into the system thereby creating at least two wave trains therein. In a manner not entirely understood, the wave trains act upon the dispersed phase to enhance or improve its separability from the continuous phase. The degree of enhancement or change in the susceptibility to separation is noted herein as the separation index, i.e., a comparative indication of the ease of separation before and after treatment in accordance with the present invention. Thus, enhancement of the separability would yield a positive separation index (greater than unity on a comparative basis with a control sample), and a degradation of the separability after treatment would be identified by a fractional separation index (a fractional value or less than unity on a comparative basis).

The treatment of dispersed systems in accordance with the present invention may be conducted either in batch or continuous operation. A feature of the present invention is in the wide latitude of its application in that it may be utilized at any convenient stage which precedes separation. In a continuous operation, it is necessary only that the residence time of the system be adequate to achieve the level of positive separation index which is desired.

A particular area in which the present invention has outstanding utility is in the fractionation of blood plasma to recover at least some of the more than 42 protein factors normally found in blood plasma.

The fractionation of blood proteins is now generally practiced according to the alcohol precipitation method introduced by E. J. Cohn. The Cohn method depends on balancing the precipitation action of the organic solvent with the solvent actions of the electrolytes present, whereby a series of conditions is established in which the solubility of any particular protein will remain relatively constant. The solubility of certain other proteins may, in some of these conditions, be such that reasonably pure separation may be possible.

In the Cohn method, five independent variables are usually controlled:

1. Electrolyte concentration.
2. Alcohol concentration.
3. Hydrogen ion concentration.
4. Temperature.
5. Protein concentration.

In practice, cooled plasma is treated with the reagents in very large vessels. Thus, after pH adjustment, the plasma or a sub-fraction thereof is cooled to a specific temperature at or below 0° C. to avoid denaturing of the protein and to achieve conditions for correct precipitation. Precipitation is achieved by adding the precipitant, usually ethanol, with stirring, the quantity of ethanol being predetermined to achieve a final concentration appropriate to the separation of a desired protein fraction. Stirring of the mixture cannot be carried out efficiently without extensive foaming which is undesirable. The process is essentially a slow one with the result that the concentration of precipitant varies continuously up to the point at which all the precipitant has been added. Consequently, precipitation of fractions takes place progressively, and a long period of ageing is required in order to approach final equilibrium. It is in practice very rare to achieve the equilibrium condition required, and the final product is almost invariably contaminated. Such bulk systems also have the disadvantage that large volumes of plasma liquor are continually at risk due to plant failure or staff errors.

Incorporation of the present invention into the Cohn method provides remarkable improvement in reducing the cycle time with no adverse effect on yield. Thus, for example, using a modified Cohn method, which is the basis for the present comparison, to obtain a complete fractionation cycle requires 168 hours. Using a further refinement of the modified Cohn method, it is possible to reduce the cycle time to 26 hours. Incorporating the present invention into the last-mentioned process reduces the cycle time to about 2.5 hours.

Preliminary data indicate that enhancement of the separation of protein factors from plasma afforded by practice of the present invention stems from an increase in the apparent density of the dispersed phase. Thus, after addition of a precipitant, clumps are formed which appear to range in size between 7 and 15 microns. Liquid plasma is believed to be trapped within the clumps. Treatment in accordance with the present invention reduces the size of the clumps to about 4 to 6 microns, apparently by the simple expedient of driving out the trapped fluid. In addition, the clumps are more amenable to the formation of aggregates after the trapped fluid has been released or forced out.

The present invention is suitable for treating colloidal systems, suspensions of particles in liquid media, and emulsions to enhance the separability of the dispersed phase or phases. Although the data and examples herein demonstrate the dramatic results flowing from use of the present invention, the mechanism responsible therefor is not completely understood at the present time.

The present invention is also eminently suited for treating aqueous solutions containing a flocculent solid. Thus, for example, it has been determined that an aqueous mixture of aluminum hydroxide floc may be treated in accordance with the present invention in order to accelerate the agglomeration of the particles and facilitate subsequent separation thereof.

The wave trains found to be particularly useful in accordance with this invention are mechanical waves which involve motion of the medium into which they are introduced. Of course, the medium must have sufficient continuity to transmit displacements from one part to another within the medium. Such wave trains may be formed by any device capable of generating a vibratory disturbance, such as for example, sonic oscillators, acoustic generators, or mechanical vibrators which can be actuated to provide wave trains of relatively low frequency. Preferably, the waves should have a finite rise and decay time such as, for example, a sine wave. This invention will be further described in connection with wave trains induced by sonic means.

One form of apparatus contemplated by the present invention comprises a rectangular vessel for confining the multiphase system to be treated as a batch system. A plurality of paddle-like plates, serving as transducers for propagating vibratory disturbances, are located within the confines of the vessel spaced one from the other. Each of the plates is connected to a separate energy source which is capable of producing vibrations in the audio frequency range. The multi-phase system to be treated is introduced into the vessel and at least two of the energy sources are tuned to provide vibratory energy at differing frequency levels. Thus, vibratory disturbances are transmitted by each of the plates, so connected, from the energy sources to and into the system. In accordance with known principles of wave propagation, not only is the system exposed to wave energy at each of the frequencies to which the energy sources are tuned, but also to the "beat" or difference frequency created within the system by the mixing of the different wave frequencies.

DESCRIPTION OF THE DRAWINGS

For a fuller understanding of the nature and objects of the invention, reference is had to the following description taken in conjunction with the accompanying drawings, in which:

FIG. 1 is a partially diagrammatic, perspective view of one embodiment of apparatus of the invention;

FIG. 2 is a sectional side view, somewhat reduced in size, of the apparatus of FIG. 1;

FIG. 3 is a plan view of an alternate embodiment of a portion of the apparatus of FIGS. 1 and 2;

FIG. 4 is a sectional side view of an alternate embodiment of apparatus similar to that of FIG. 2;

FIG. 5 is a partially diagrammatic perspective view of another embodiment of apparatus of the invention;

FIG. 6 is a vertical section along the line 6—6 of FIG. 5;

FIG. 7 is a partially diagrammatic perspective view of still another embodiment of apparatus of the invention;

FIG. 8 is a side elevation, with portions sectioned to show underlying structure, of another embodiment of apparatus of the invention;

FIG. 9 is a vertical section along the line 9—9 of FIG. 8;

FIG. 10 is a diagrammatic perspective view of another embodiment of apparatus of the invention; and FIG. 11 is a diagrammatic perspective view of an embodiment of apparatus of the present invention particularly suitable for blood plasma fractionation.

With reference to FIGS. 1 and 2, one embodiment of apparatus 21 of the invention includes a rectangular container 22 for holding a multi-phase system which may be a liquid dispersion. The container has an inlet 23, and an outlet 24 for the supernatant liquid or continuous phase, and an outlet 25 for removal of the separated dispersed phase. The container 21 may be totally enclosed to minimize losses of liquid dispersion by evaporation or it may be open at the top, as shown. The container may be formed of any material able to withstand the vibrations and which will avoid contamination of the liquid dispersion. Such materials include stainless steel or other metal, or a transparent material such as glass or heavy-duty plastic.

A first means 26 for generating vibratory energy is connected to a wall of the container, such as on the bottom plate 27 of the container so as to vibrate the container 22 as a whole through transmission means 28. The bottom wall 27 of the container is sloped downwardly in the direction of the precipitate outlet 25 so as to facilitate removal of the precipitate from the container. A second means 29 for generating vibratory energy is connected to a plurality of plates 31 disposed vertically within the container 22, through transmission means 32. Plates 31 serve as transducers which expose the system to the energy from means 26 and 29. Suitable apertures such as slots 33 are provided in the plates 31 to permit flow of liquid dispersion through the plates. One suitable means for generating vibratory energy is a variable speed electric motor connected to transmission means 28 and 32 through suitable eccentrics (not shown). Plates 31 may be any suitable material which will serve as a transducer, i.e., metals, plastics and the like.

For monitoring the extent of sedimentation or precipitation, densitometer or nephelometer photocell components 34 and 35 are suitably located in or on side walls of the container 22, and connected to a recording apparatus (not shown). By measuring the density of the dispersion during operation of the apparatus 21, it can be determined when precipitation of the dispersed phase is substantially completed. Such monitoring techniques are well known and therefore need not be described further.

In operation, the liquid dispersion to be fractionated is admitted to the container 22 through inlet 23, the rate of admission being controlled by suitable valving (not shown). Means 26 and 29 are then activated to provide frequencies, frequency differentials and amplitudes selected for compatibility with the structural characteristics of the apparatus and minimization of denaturing of the dispersion.

Another means for permitting passage of liquid dispersion through the plates 31 is shown in FIG. 3. In place of the slots 33, holes 37 are provided. Moreover, the number of plates 31 may be increased, as illustrated in FIG. 4, and various means may be employed for reflecting the wave trains, such as the baffle plates 38 as shown in FIG. 4. It will also be evident, with respect to any of the embodiments of the apparatus, that more than two means for generating vibratory energy may be employed.

In another embodiment 38 of apparatus, illustrated in FIGS. 5 and 6, the container is an elongated tubular vessel 41 having closed ends except for a liquid dispersion inlet 42 and an outlet 43 for the supernatant liquid or continuous phase. An outlet 44 is positioned at any suitable point along the bottom of the vessel 41 for separation of the precipitate as it forms. As in the embodiment of FIG. 1, suitable valving (not shown) may be provided for control of flow of liquid dispersion and separated components.

Any material suitably resistant to vibrations but able to transmit vibrations may be used in the manufacture of the tubular vessel 41. Generally, as in the embodiment of FIG. 1, a somewhat non-rigid material such as a hard plastic may be employed but certain siliceous materials are also effective. The material of the vessel is also selected on the basis of compatibility with the components of the liquid dispersion. For example, certain plastics which are attacked by certain emulsifiers or other components of liquid dispersions are to be avoided.

A series of separator or baffle plates 45 are disposed within the vessel 41 to provide sufficient turbulence in the liquid dispersion. The plates 45 have sectioned lower edges 46 to permit flow of precipitated material along the bottom of the vessel, and these plates, as well as other plates 48 not in the path of the precipitated material, are apertured as with holes 47 and 49, to facilitate flow.

A pair of means 51 and 52 are positioned preferably on opposite sides of the vessel 41. The vibratory energy is directed to provide maximum contact with the liquid dispersion and also to avoid any significant degree of disturbance of precipitated material in the lower portion of the vessel. In this embodiment, means 51 and 52 preferably are sonic generators which directly vibrate the wall of the vessel 41, but equivalent energy sources will be readily apparent.

Another embodiment 53 of the apparatus of the invention is illustrated in FIG. 7. Here, a tubular vessel 54 somewhat similar to that of FIG. 5 is utilized, but in a vertical position. The vessel 54 is provided with a liquid dispersion inlet 55, an outlet 56 for supernatant liquid or continuous phase (located in the wall of the vessel at a position somewhat lower than inlet 55), and an outlet 57 for precipitated material, positioned in the lower end of the vessel, preferably at the terminal end of a slight downward slope in the bottom wall of the vessel.

A pair of means 58 and 59 are provided to generate vibratory energy, wherein the first means 58 directly vibrates the entire vessel or only the lower wall of the vessel. The second means 59 is connected to a transducer disk 61 having apertures such as holes 62, for transmitting energy to the liquid dispersion within the vessel 53. The disk 61 may be rotated by any suitable means to avoid collection of precipitate on the disk.

The operation of apparatus 53 is similar to that of the above-described embodiments. The liquid dispersion is admitted to the vessel, at flow rates governed by suitable valving (not shown), and means 58 and 59 are operated at suitable frequencies and frequency differentials selected for optimum rate of precipitation and minimum denaturing of the components of the dispersion. The rate and extent of precipitation may be monitored by suitable nephelometer devices, as in the previous embodiments.

Still another embodiment 63 of apparatus of the invention, somewhat similar to that of FIG. 1, is illustrated in FIGS. 8 and 9. In this embodiment a rectangular container again is utilized having vertical side walls 64, a liquid dispersion inlet 65, and outlet 66 for supernatant liquid or continuous phase, and an outlet 67 for precipitated material. One difference is the provision of at least one sloped lower wall portion, here shown as the two opposing lower wall portions 68, to facilitate collection and removal of the precipitated material at outlet 67. Another difference is that the energy means comprises a vibrator 69, such as a sonic generator, which vibrates the liquid dispersion in the container through a diaphragm 71 mounted in the wall 64. A similar means 72 is connected to a diaphragm 73 and is mounted in an opposing wall. It will be understood that the container may be cylindrical rather than rectangular so that only a single vertical wall 64 is present.

Still another difference is the provision of multiple monitoring devices, such as the nephelometer photocell components 74 and 75 positioned just below the outlet 66, and a second pair of photocell components 76 and 77 positioned at right angles to the first pair of components but near the precipitate outlet 67. By means of suitable circuitry and valving (not shown) the rates of feed and withdrawal of liquids and precipitated material may be cooordinated so that the fractionation proceeds on a continuous basis. Monitoring systems including valving which will provide such operations are known and description therefore is unnecessary.

Another embodiment of this invention is illustrated in FIG. 10. In this embodiment two paddle-like transducers 81 and 82 are connected to means 85 and 86 for generation of vibratory energy through transmission means 83 and 84. Transducers 81 and 82 are mounted so as to be submerged in the multi-phase system contained within vessel 87. A photoelectric cell 88, as described in connection with FIGS. 1 and 8 is positioned outside adjacent opposite walls of vessel 87. This figure illustrates the apparatus necessary for carrying out this embodiment of the present invention. A pair of variable signal generators 89 are each electrically connected to separate power amplifiers 90 which in turn transmit the amplified signal to means 85 and 86. Means 85 and 86 for generation of vibratory energy are represented in the figure as magnetic-type drivers which are also known in the art as "Shakers." The signal generated is visually displayed on frequency meters 91. The drivers convert the electrical energy into vibratory energy which is transmitted into the system within vessel 87.

FIG. 11 depicts another apparatus in accordance with the present invention which has been found to be particularly suitable for use in fractionating blood plasma. The apparatus comprises a cylinder 92 having an interior diameter of approximately 2½" and being approximately 12" long. The two ends of cylinder 92 are closed with a rubber diaphragm 92 through which transmission shafts 93 are introduced into the interior of the cylinder. Flat disks 94 approximately 2" in diameter are connected to the ends of shafts 93. The transmission shafts are externally connected to a system such as that shown in FIG. 10 which is capable of producing sonic energy. Using the apparatus of FIG. 11, at frequencies of the order of 150 c.p.s., with a difference frequency of approximately 4 to 6 c.p.s. provides advantageous results in the separation of protein factors from blood plasma. The apparatus shown in FIG. 11 is continuous in that plasma is introduced into cylinder 92 through inlet port 95, the plasma travels down through the tube and exits through port 96.

Several empirical guidelines have been established for selection of vibratory frequencies for the practice of the present invention. Generally the vibration frequencies should lie in the lower portion of the audio range, i.e. below about 1000 c.p.s. Particularly good results are obtained in the range of 50–200 c.p.s. Frequency differentials should generally be of the order of 2–20 c.p.s., with a 3–10 c.p.s. difference being effective. Amplitude of the vibrations may be between 0.1 and 0.001 inches, more or less, depending upon the geometry of the transducers and the apparatus.

In the following examples, which illustrate the invention, the proportions expressed are in parts by weight unless expressly stated otherwise.

EXAMPLE I

Following is the description of the precipitation of fibrinogen as a step in the purification of the antihemophilic factor of blood plasma. It will be understood that this example is but representative of the wide range of biological dispersions to which the invention is applicable.

Antihemophilic Factor (AHF) Human Concentrate provided by E. R. Squibb & Sons, representative of material subjected to conventional fractionation, is first reconstituted as a solution as follows. Into a 1000 ml. beaker is measured 900 ml. of distilled water at 37° C. Fifty ml. of .02 M triscitrate (a mixture of sodium citrate the trishydroxy methyl aminomethane made up by mixing .02 M of each in one liter of water) at pH 6.1±0.5 and 37° C. is added to 625 mg. of Antihemophilic Factor and the Factor is dissolved very slowly, without shaking or agitation, by revolving the bottle in the hand, so as not to allow foam to form. When the Factor is dissolved, an additional 50 ml. of the .02 M triscitrate is added to the solution. The resulting solution is then added to the 900 ml. of distilled water at 37° C. If necessary, the pH is then adjusted to 6.1±.05. The resulting mixture may either be a clear solution or a somewhat cloudy dispersion.

A fractionator apparatus as in FIG. 1 is arranged, having a container 22 which holds approximately 250 ml. of liquid. A first motor vibrates the two vertical plates 31 in unison at a frequency of 120 cycles/sec. A second motor vibrates the whole container 22 at a selected frequency of 110–117 cycles/sec. Through one side of the box a light beam is directed through the liquid to the other side where the photocell of a densitometer is lined up to receive the beam of light, thereby measuring the density of the solution.

The eccentrics of the motors connecting the plates 31 and container 22 to the motors are set at .02 inch. Then, 250 ml. of the solution is placed in the container 22 without the motors running. The densitometer is set to read zero by means of a zero adjust control. The solution is then removed from the fractionator into a 750 ml. flask and 20 ml. of 50% polyethylene glycol in .02 M triscitrate (pH 6.1) is added to the solution. The flask is gently rotated for thorough mixing and so that the mixture is a uniformly very cloudy colloidal dispersion. The dispersion is then poured gently back into the fractionator container 22 and the densitometer is adjusted to a value of 80. The first motor is set to provide vibrations of the plates 31 of 120 cycles/sec. frequency, and the second motor is set to provide vibrations of the container 22 of 110–117 cycles/sec. frequency. Periodically, as required, the second motor is adjusted to give approximately 3 to 10 vibrations per second frequency differential. The precipitation starts at once and the coagulation is accelerated so that if the vibrations are stopped after only about 5 minutes, the particles will totally precipitate in under about 1 hour, as compared with about 20 hours in conventional settling techniques, giving a separation index of about 20. It is observed that during about the first two minutes the density goes up in value, and in another two minutes returns to the starting value of 80. From then on the change in density is continually to lower values at a rate of about 0.8 density units/minute.

When the test is completed and the container emptied, a fibrinogen deposit is collected from the bottom of the container. The photo-density of the liquid remaining in container 22 is almost clear at the end point and has a photo-density value of 10–20 units. This value is lower than 25–30 units photo-density value that would be obtained by quiescent aging or settling for a period of 20 hours. The results indicate that the present invention provides photo-density reductions of about 40%, while the time required to obtain the low photo-density is reduced by about 90%.

EXAMPLE II

In this example a water-aluminum hydroxide flocculent admixture was treated in an apparatus such as that shown in FIG. 10. The treatment conditions were varied over a range of differing frequency differentials and voltage inputs to the magnetic-type driver ("Shaker").

The apparatus comprised a pair of signal generators manufactured by Radio Corporation of America, Harrison, N.J. and identified as Model No. WA–504–A. Each signal generator was connected to a frequency display meter which presented a visual display of the respective frequency output. The display meters were of the Heath Company, Benton Harbor, Mich. and identified as Model 1B101. The signal from each signal generator was fed into a power amplifier manufactured by Ling Electronics Corporation, Anaheim, Calif. and identified as Model 100. The power amplifiers were regulated as to their output power by a voltage regulator. Each power amplifier was electrically connected to a magnetic-type driver ("Shaker") manufactured by Ling Electronics Corporation, Royston Herts, England, and identified as Model Type 411. The drivers ("Shaker") were in turn connected to a plexiglass transducer element through a transmission shaft.

The current required by each power amplifier was less than about .5 amperes in each run tabulated below.

The vessel in which the aluminum hydroxide-water mixture was placed was a rectangular vessel approximately 6 inches long by 3 inches deep by about 2 inches wide. The two paddle-like transducers were made of plexiglass and measured about 1½ square inch and about ¼ inch in thickness. They were immersed to about ½ inch above the bottom of the vessel and about 2 inches apart. All other conditions were ambient.

The aluminum hydroxide-aqueous mixtures were prepared by combining 250 ml. of an aqueous solution of 2 grams per liter of aluminum sulphate and 12.5 ml. of a solution of 2 grams per milliliter of sodium carbonate. The resulting aluminum hydroxide floc-water admixture was then placed in the vessel and exposed to the vibrational treatments described; the results obtained are tabulated below. The time which elapsed between the beginning of the vibrational treatment and the time it took for the photodensity, as measured by the photoelectric cell, to reach the neutral point was recorded and is tabulated below, i.e., the time in which it took the floc to settle below the photoelectric cell. Four different frequencies and frequency differentials were used in these runs. These were frequencies of 77 c.p.s. in combination with 80 c.p.s.; 77 c.p.s. alone; 152 c.p.s. in combination with 155 c.p.s.; and 152 c.p.s. alone.

TABLE

| Run | Voltage | Time (seconds) | Separation index |
|---|---|---|---|
| A. Frequencies: 77 c.p.s./80 c.p.s. | | | |
| 1 | Control—No acoustic energy | 1,180 | |
| 2 | 0.6 | 600 | 1.97 |
| 3 | 0.7 | 440 | 2.68 |
| 4 | 0.8 | 400 | 2.95 |
| 5 | 0.9 | 360 | 3.28 |
| 6 | 1.0 | 320 | 3.69 |
| 7 | 1.1 | 240 | 4.92 |
| 8 | 1.2 | 360 | 3.28 |
| 9 | 1.3 | 400 | 2.95 |
| B. Frequency: 77 c.p.s. | | | |
| 10 | Control—No acoustic energy | 1,030 | |
| 11 | 0.8 | 560 | 1.84 |
| 12 | 0.9 | 480 | 2.15 |
| 13 | 1.0 | 400 | 2.57 |
| 14 | 1.1 | 460 | 2.24 |
| 15 | 1.2 | 400 | 2.57 |
| 16 | 1.3 | 440 | 2.34 |
| 17 | 1.4 | 420 | 2.45 |
| C. Frequencies: 152 c.p.s./155 c.p.s. | | | |
| 18 | Control—No acoustic energy | 640 | |
| 19 | 1.5 | 420 | 1.52 |
| 20 | 1.6 | 330 | 1.94 |
| 21 | 1.7 | 460 | 1.39 |
| 22 | 1.8 | 390 | 1.64 |
| 23 | 2.0 | 480 | 1.33 |
| D. Frequency: 152 c.p.s. | | | |
| 24 | Control—No acoustic energy | 920 | |
| 25 | 1.5 | 720 | 1.28 |
| 26 | 1.6 | 760 | 1.21 |
| 27 | 1.8 | 780 | 1.18 |
| 28 | 2.2 | 680 | 1.35 |
| 29 | 2.4 | 680 | 1.35 |
| 30 | 2.6 | 560 | 1.64 |
| 31 | 2.8 | 590 | 1.56 |
| 32* | Control—No acoustic energy | 680 | |

*The floc in this run was prepared from an aged solution and is not representative of a typical run. It should be disregarded.

Three parameters which affect the results achieved by practice of the present invention are:

(1) The specific level of the two or more vibration frequencies which are used to create the wave trains formed in the multi-phase system.
(2) The differential or "beat" frequency, which is the arithmetic difference between the two vibration frequencies utilized.
(3) The energy level at which the pulses are introduced into the system.

The absolute level of the freqencies used in accordance with this invention is controlled, at the extreme upper limit by the need to avoid cavitation within the system. For example, it is well known that ultrasonic frequencies cause cavitation, and in turn, it is also known that such turbulence and the high shear forces associated therewith are destructive to, for example, blood plasma which contains highly sensitive protein factors.

As shown by the examples and data set forth herein, vibration frequencies between about 50 c.p.s. and about 200 c.p.s. are quite useful, with good results having been obtained at values of about 75 c.p.s. to 160 c.p.s. Advantageous results have been obtained using pairs of frequencies at or about 77 to 80 c.p.s., 110 to 120 c.p.s. and 150 to 160 c.p.s. In general, the data thus far obtained demonstrate that at frequencies below 1,000 c.p.s., highly desirable results are obtained.

With respect to the frequency differential, it has been found, in general, that a difference or "beat" frequency in the range of about 2 to 20 c.p.s. provides useful results. In systems involving the separation of protein factors from blood plasma, frequency differences ranging from between about 3 c.p.s. to 10 c.p.s. are quite suitable, with differences between about 4 to 6 c.p.s. being preferred.

The data reflected in the Table shown in Example II clearly indicate that an improvement is obtained when only a single frequency is utilized. It is equally clear that the use of two different frequencies provides a substantial improvement over the standard or control run. There is no clear explanation for these phenomena. However, it is believed that the improvement resulting from the use of a single vibration frequency is due to one type of interaction between the wave train and the multiphase system, whereas a different mechanism is responsible for the improvement obtained when two vibration frequencies are used.

With respect to the third parameter described above, the energy level, this is the least sensitive from the point of view of obtaining meaningful results in accordance with the present invention. It is necessary to use at least that level of energy input necessary to create wave trains in the system with accompanying enhancement of the separability of the dispersed phase from the balance of the system. The data set forth herein indicate that at a relatively low level of energy input, highly advantageous results are obtained. Thus, for example, in the runs of Example II utilizing frequencies of 77 and 80 c.p.s., a substantial advantage was obtained with an input at each frequency of only 0.6 volts at a current of less than 0.5 amperes. Thus, the approximate energy input is of the order of 0.6 watts.

Theoretically, the energy introduced into a multiphase system using, for example, the apparatus shown in FIG. 10, would depend upon the area of the transducer plate, the amplitude of movement thereof, and the shape of the wave energy created by the plates.

The maximum energy which can be used is limited by the creation of cavitation within the liquid being treated. This is undersirable for the reasons set forth above. However, as can be seen once again from the data shown in Example II, the voltage or energy input can be varied more than two-fold without substantially changing the results obtained. Of course, maintaining the amplitude of movement and size of transducer at a constant value and increasing the frequency results in an increase in the energy input. Likewise at constant frequency and size, increasing the amplitude also increases the energy introduced into the system.

Referring once again to the data shown in Example II, it is noted that increasing the voltage above that value which yields optimum separation tends to reduce the efficiency of the process. It is belived that this results from the tendency of the system to become agitated which works counter to the desired gravity settling of the agglomerating particles. In those systems in which treatment in accordance with this invention is followed by filtration or centrifugal separation, using energy levels higher than optimum will not disadvantageously affect the treatment.

It will be noted that in the devices shown in the drawings herein, the transducers are located in opposed relationship, which in turn creates wave trains which move in opposed directions. The system to be treated is preferably confined within the space between the opposed transducers, where the greatest interference between the opposed wave trains occurs.

It is not necessary that the transducers or wave trains created thereby be geometrically opposed in the sense that the wave trains are propagated in exactly parallel but opposite directions. It is necessary only that the transducers be oriented so that mixing of the wave trains occurs to create a "beat" or difference frequency.

In utilizing the principles of this invention, the time of treatment should be selected by reference to the period of time during which the multi-phase system is exposed to the vibratory energy. Thus, a multi-phase system may be treated in batch, semi-continuous, or continuous processes provided each volume being treated is exposed to the wave trains for a finite time determined by the characteristics of the particular system under consideration.

It may be desirable to maintain certain systems at the isoelectric point. In other words, the particle charges should be as close to electrical neutrality as possible in order to avoid mutual repulsion by like charged particles which would reduce the number of particle collisions, and which in turn would reduce the aggregation of the particles. Maintaining a system at its isoelectric point can be achieved by methods known in the art such as control of the pH, salt content, and the like.

The technical terms and pharases used herein are to be defined in accordance with the definitions found in the International Dictionary of Physics and Electronics, 2nd Edition, Van Nostrand (1961).

Although the present invention has been described herein in connection with the apparatus depicted in the drawings and specific examples, it is to be understood by one skilled in the art that these drawings and examples are intended to be illustrative and that modifications and changes may be made without departing from the spirit and scope of the invention.

I claim:

1. The method of treating a multi-phase system to enhance the separability of at least one discontinuous phase contained therein comprising the steps of:
    (a) propagating in said system at least two vibratory disturbances;
    (b) forming thereby in said system at least two wave trains at two different frequencies within the audio frequency range; and,
    (c) the propagation of said disturbances being oriented to provide mixing of said wave trains while avoiding cavitation within the system.

2. The method of claim 1 in which said two wave trains are at respective frequencies below about 1000 cycles per second.

3. The method of claim 2 in which said two wave trains are at respective frequencies in the range of from about 50 to about 200 cycles per second.

4. The method of claim 3 including the step of treating said system with said vibratory disturbances for a time sufficient to achieve a positive separation index of said discontinuous phase.

5. The method of claim 4 including the step of treating said system in a confined space and wherein said system has a liquid continuous phase and at least one dispersed phase of particles of at least colloidal size.

6. The method of treating a multi-phase system comprising a liquid continuous phase and at least one dispersed phase of particles of at least colloidal size to enhance the separability of at least one discontinuous phase contained therein comprising the steps of:
 (a) propagating in said system at least two vibratory disturbances;
 (b) forming thereby in said system at least two wave trains at two different frequencies below 1000 cycles per second and different one from the other by about 2 to 20 cycles per second; and
 (c) the propagation of said disturbances being oriented to provide mixing of said wave trains while avoiding cavitation within the system and being for a time sufficient to achieve a positive index of said discontinuous phase.

7. The method of claim 6 in which the said two wave trains are at respective frequencies in the range of from about 50 to about 200 cycles per second.

8. The method of claim 7 in which the said two wave trains have respective frequencies which differ one from the other by about 3 to about 10 cycles per second.

9. The method of claim 6 wherein at least one of said dispersed phases is in the form of a flocculent solid.

10. In the method of treating blood plasma to remove selected protein factors therefrom which involves selective adjustment of pH and temperature of the plasma and the addition of specific precipitants, the improvement comprising the steps of:
 (a) propagating in said blood plasma two vibratory disturbances;
 (b) forming thereby within said blood plasma two wave trains at frequencies which are below about 1000 cycles per second and which differ one from the other by about 2 to 20 cycles per second, and which mix; and,
 (c) treating said plasma with said disturbances for a time sufficient to enhance the separability of at least one of the said selected protein factors from said blood plasma while avoiding cavitation within the system.

11. The method of claim 10 in which said wave trains are at respective frequencies in the range of from about 50 to about 200 cycles per second, and the frequencies differ one from the other by about 3 to 10 cycles per second.

12. The method of claim 11 in which the said two frequencies are approximately 150 cycles per second and differ one from the other by about 4 to about 6 cycles per second.

13. An apparatus for treating a multi-phase system having a liquid continuous phase to enhance the separability of a dispersed phase contained within said system comprising:
 (a) first and second means for generating vibratory disturbances below about 1000 cycles per second and different one from the other by about 2 to 20 cycles per second within said volume to form respective trains of waves therewithin; and,
 (b) said first and second generating means being positioned with respect to each other so that the respective wave trains formed within said volume mix.

14. The apparatus of claim 13 wherein said first generating means is connected to said confining means in contact with said liquid continuous phase, and wherein said second means is positioned to contact said liquid continuous phase.

15. The apparatus of claim 13 wherein said first and second generating means are positioned to contact said liquid continuous phase.

References Cited
UNITED STATES PATENTS

| | | | |
|---|---|---|---|
| 2,514,471 | 7/1950 | Calhoun | 210—19 X |
| 2,578,505 | 12/1951 | Carlin | 210—19 X |
| 2,033,121 | 3/1936 | Chambers | 210—19 X |
| 2,688,402 | 9/1954 | Butterworth | 210—19 X |
| 2,667,407 | 1/1954 | Fehske et al. | 210—19 X |
| 3,660,279 | 5/1972 | Hoff | 210—19 |
| 3,480,529 | 11/1969 | Waltrip | 210—19 X |
| 3,677,710 | 7/1972 | Hirsch | 210—83 X |

FRANK A. SPEAR, JR., Primary Examiner

U.S. Cl. X.R.

210—83, 521

UNITED STATES PATENT OFFICE
CERTIFICATE OF CORRECTION

Patent No. 3,826,740          Dated July 30, 1974

Inventor(s) Warren R. Jewett

It is certified that error appears in the above-identified patent and that said Letters Patent are hereby corrected as shown below:

Column 5, line 1, delete "38" and insert therefor --39--

Column 10, line 8, delete "belived" and insert therefor --believed--

Signed and sealed this 8th day of October 1974.

(SEAL)
Attest:

McCOY M. GIBSON JR.          C. MARSHALL DANN
Attesting Officer            Commissioner of Patents